United States Patent [19]

Hergenrother et al.

[11] 4,221,899
[45] Sep. 9, 1980

[54] POLYPHOSPHAZENE POLYMERS CONTAINING SUBSTITUENTS DERIVED FROM ALKYL OR ARYL HYDRAZINES

[75] Inventors: William L. Hergenrother, Akron; Adel F. Halasa, Bath, both of Ohio

[73] Assignee: The Firstone Tire & Rubber Company, Akron, Ohio

[21] Appl. No.: 953,312

[22] Filed: Oct. 20, 1978

[51] Int. Cl.² .................... C08G 79/02; C08G 73/00
[52] U.S. Cl. ................................ 528/168; 528/374; 528/399
[58] Field of Search .................. 528/339, 168, 374

[56] References Cited

U.S. PATENT DOCUMENTS

| | | | |
|---|---|---|---|
| 2,214,769 | 9/1940 | Lipkin | 528/399 |
| 3,474,052 | 10/1969 | Halasa et al. | 260/3 |
| 3,893,980 | 7/1975 | Allcock et al. | 528/168 |

*Primary Examiner*—Wilbert J. Briggs, Sr.

[57] ABSTRACT

Polyphosphazene polymers are prepared which contain units represented by the formulas:

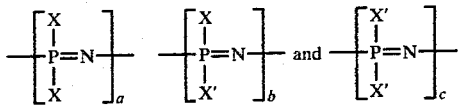

wherein X is

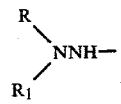

in which R and $R_1$ are selected from the group consisting of alkyl groups containing from 1 to 12 carbon atoms, cycloalkyl groups containing from 3 to 12 carbon atoms and aryl groups; wherein X' is X or is selected from the group consisting of substituted or unsubstituted alkoxy, aryloxy, amino and mercapto groups and wherein $20 \leq (a+b+c) \leq 50,000$ per polymer.

The polymers of the invention can be utilized to form films and may also be utilized in applications such as complexing agents, moldings, coatings, foams and the like.

12 Claims, No Drawings

POLYPHOSPHAZENE POLYMERS CONTAINING SUBSTITUENTS DERIVED FROM ALKYL OR ARYL HYDRAZINES

BACKGROUND OF THE INVENTION

This invention relates to a polyphosphazene polymers containing repeating

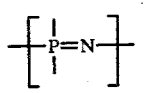

units in the polymer chain in which substituents derived from alkyl or aryl hydrazines are attached to the phosphorus atom. More particularly, the invention relates to homopolymers containing substituents having the structure:

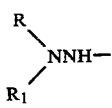

(defined hereinafter) and to copolymers containing such substituents along with other compatible substituents.

Polyphosphazene polymers containing repeating

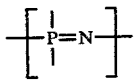

units in which various alkoxy, substituted alkoxy, aryloxy, substituted aryloxy, amino and mercapto groups are attached to the phosphorus atom and their method of preparation are described in the prior art as illustrated in the publication "Phosphorus-Nitrogen Compounds", Academic Press, New York, N.Y., 1972 by H. R. Allcock and "Poly(Organophosphazenes)", Chemtech, Sept. 19, 1975 by H. R. Allcock and in such U.S. Pat. Nos. as 3,515,688; 3,702,833; 3,856,712; 3,974,242 and 4,042,561, the disclosures of which are incorporated herein by reference.

SUMMARY OF THE INVENTION

In accordance with this invention, polyphosphazene polymers are prepared which contain units represented by the formulas:

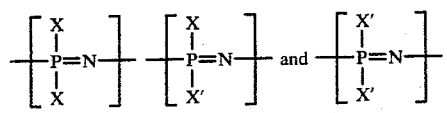

wherein X is represented by the formula

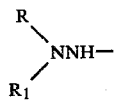

in which R and $R_1$ are seleced from the group consisting of alkyl groups containing from 1 to 12 carbon atoms, cycloalkyl groups containing from 3 to 12 carbon atoms and aryl groups and wherein X' is X or is from the group consisting of substituted and unsubstituted alkoxy, aryloxy, amino and mercapto groups.

As will be evident from the above formulas, when X and X' are the same, homopolymers are formed whereas when X and X' are different, copolymers are formed.

In the copolymer units represented by the above formulas, all X substituent groups may be the same or they may be mixed and all X' substituent groups may be the same or mixed. In the mixtures, the X substituent groups may be mixtures of substituent groups derived from different alkyl or aryl hydrazines and the X' substituent groups may be mixtures of alkoxy, aryloxy, amino and mercaptan groups or mixtures of different groups within each class (i.e. different akoxy, aryloxy etc.).

The specific proportion of X to X' sustituent groups incorporated in the polymers of the invention may vary considerably depending upon the particular end use for which the copolymer is intended and the chemical and physical properties desired. Thus, for applications such as moldings, coatings, foams and the like, the polymer should contain at least ten (10) mole percent of the X substituent.

The polymers are prepared by reacting a poly(dichlorophosphazene) having the formula —(NPCl$_2$)$_n$— in which n is from 20 to 50,000 with an alkyl or aryl hydrazine or a mixture of such hydrazines and a substituted or unsubstituted aliphatic alcohol, aromatic alcohol, amino compound or mercaptan compound in the presence of a tertiary amine. An especially useful alkyl hydrazine is N,N-dimethyl hydrazine, and an especially useful aryl hydrazine is diphenyl hydrazine hydrochloride.

DETAILED DESCRIPTION OF THE INVENTION

The term "polymer" as employed hereinafter throughout the specification and claims is utilized in its broad sense and includes homopolymers, copolymers, terpolymers and the like.

I. THE POLY(DICHLOROPHOSPHAZENE) POLYMER

Poly(dichlorophosphazene) polymers which are employed as starting materials in preparing the polymers of this invention are well known in the art as illustrated in U.S. Pat. Nos. 3,370,020; 4,005,171; and 4,055,520, the disclosures of which are incorporated herein by reference.

These polymers have the general formula —(NPCl$_2$)$_n$— in which n may range from 20 to 50,000 or more. As described in the aforementioned references, the polymers are in general prepared by the thermal polymerization of cyclic oligomers having the formula —(NPCl$_2$)$_n$—, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about 10$^{-1}$ Torr to superatmospheric and times may range from 30 minutes to about 48 hours.

A preferred process for preparing the poly-(dichlorophosphazene) polymers used in the process of this invention is described in the aforementioned incorporated U.S. Pat. No. 4,005,171.

II. THE HYDRAZINE SUBSTITUENTS

Alkyl or aryl hydrazines which may be employed in forming the

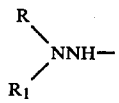

substituent group are those represented by the formula

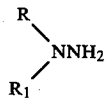

in which R and $R_1$ are selected from the group consisting of alkyl groups containing from 1 to 12 carbon atoms, cycloalkyl groups containing from 3 to 12 carbon atoms and aryl groups.

Illustrative examples of alkyl and aryl hydrazines which may be employed include dialkyl hydrazines such as dimethyl hydrazine, diethyl hydrazine, di-n-butyl hydrazine, di-n-propyl hydrazine and the like; dicycloalkyl hydrazines such as dicyclohexyl hydrazine, dicyclooctyl hydrazine and the like and diaryl hydrazines such as diphenyl hydrazine, ditolyl hydrazine and the like. The preferred hydrazines are dialkyl hydrazines, particularly dimethyl hydrazine and diaryl hydrazines, particularly diphenyl hydrazine.

As indicated, polymers containing substituents derived from such hydrazines can be utilized to form films and may also be utilized as complexing agents for metallic salts and in applications for moldings, coatings, foams and the like. In addition, the hydrazine substituent group in the polymer can serve as a site for post reactions such as crosslinking.

III. THE ALKOXY, ARYLOXY, AMINO AND MERCAPTO SUBSTITUENTS

As indicated heretofore, the polyphosphazene polymers of this invention in addition to the

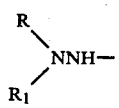

substituent group may contain substituted or unsubstituted alkoxy, aryloxy, amino or mercapto groups or mixtures thereof.

The alkoxy groups (substituted or unsubstituted) may be derived from aliphatic alcohols having from 1 to 20 carbon atoms such as methanol, ethanol, propanol, isopropanol, n-butanol, sec-butanol, hexanol, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol; 2,2,3,3,4,4,4-heptafluoro-butanol; 2,2,3,3-tetrafluroro-propanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The aryloxy groups (substituted or unsubstituted may be derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; the alkoxy-substituted phenols such as 4-methoxyphenol, 4-(n-butoxy) phenol and the like. Mixtures of the foregoing aromatic alcohols may also be employed.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561, incorporated herein by reference, as illustrated by aniline, halogen-substituted anilines, alkyl-substituted anilines, alkoxy-substituted anilines and the like.

The mercapto groups may be derived from any of the meraptan compounds heretofore employed in the polyphosphazene polymer art. Thus, for example, the mercaptan compounds described in U.S. Pat. No. 3,974,242 to Lanier et al., incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like.

Preferred substituent groups represented by X' for use in these polymers substituted or unsubstituted alkoxy groups and aryloxy groups (e.g. —OR groups in which R is a substituted or unsubstituted alkyl or aryl radical) and of these fluoroalkoxy and chlorophenoxy are especially preferred.

IV. THE TERTIARY AMINE

The use of the tertiary amine in preparing the polymers of the invention minimizes undesirable side reactions and at the same time acts as an effective acid scavenger.

Tertiary amines which may be employed in preparing the polymers of the invention are those represented by the general structure:

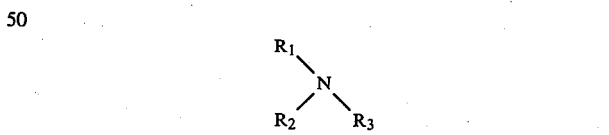

wherein $R_1$, $R_2$ and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABC0), N-methyl pyrolle and N-methyl morpholine can also be utilized.

The preferred tertiary amines for use in preparing the polymers of the invention are triethylamine, N,N,N',N'-tetramethylethylene diamine (TMEDA) and pyridine.

As mentioned heretofore, the polymers of the present invention are prepared by reacting the poly(dichlorophosphazene) polymer, the alkyl or aryl hydrazine or a mixture of said hydrazines and an aliphatic alcohol, aromatic alcohol, amino compound or mercaptan compound in the presence of a tertiary amine.

The speciffic reaction conditions and proportion of ingredients employed in preparing these polymers can vary somewhat depending on factors such as the reactivity of the specific reactants and the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e., in order to insure substantially complete conversion of the chorine atoms in the polymer to the corresponding esters of the reactant compounds.

The above reaction is ordinarily carried out in the presence of a solvent. The solvent employed in the reaction should be a solvent for the poly(dichlorophosphazene) polymer, the hydrazine reactant, other desired reactants and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the hydrazine reactant and other reactants employed in the process should be at least molecularly equivalent to the number of available chloride atoms in the polymer mixture. However, if desired, an excess of such reactants may be employed in order to insure substantially complete reaction of all the available chlorine atoms.

The following examples are submitted for the purpose of further illustration the nature of the present invention and are not intended as a limitation on the scope thereof. Parts and percentages referred to in the examples are by weight unless otherwise indicated.

EXAMPLE 1

Preparation of a

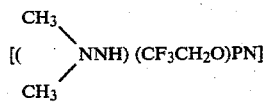

Polymer

To a 10 ounce bottle was charged 100 cc of dry tetrahydrofuran (hereinafter THF), 3.38 cc of dry N,N-dimethyl hydrazine (44 millimoles), 12.3 cc of dry triethylamine (88 millimoles), 3.2 cc of dry trifluoroethanol (44 millimoles) and 30.7 grams (40.0 millimoles) of a 15.1 percent solids solution of poly(dichlorophosphazene), having a degree of polymerization of about 2600, in THF. An instantaneous reaction occurred upon mixing as was evidenced by the formation of triethylamine hydrochloride and the evolution of heat. The bottle was heated for 20 hours at 120° C. and resulted in the formation of a white milky suspension and a layer of amine salt. Coagulation in hexane produced 2.7 grams of a white powder. An attempt to wash the salt layer with methanol resulted in a solubilization of the entire solid layer and the loss of the remaining polymeric product.

A sample of the recovered polymeric product from the coagulation procedure was pressed at 150° C. under a pressure of 120 psi and resulted in the production of a clear hard film. An elemental analysis of the remaining polymeric product showed the following:

|  | %C | %H | %N | %P | %Cl |
|---|---|---|---|---|---|
| Actual | 23.65 | 4.64 | 19.02 | 16.27 | 3.28 |
| Calculated* | 23.65 | 4.64 | 19.02 | 16.27 | 3.28 |

*Based upon 6.9% triethylamine hydrochloride, 2.4% chloropolymer, 6.9% hydrolyzed chloropolymer, 53.7% trifluoroethanol derivative and 31.9% dimethyl-hydrazine derivative.

EXAMPLE 2

Preparation of

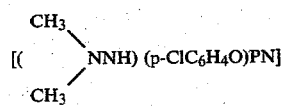

Polymer

To a 10 ounce bottle was charged 100 cc of THF, 3.34 cc of N,N-dimethyl hydrazinne (44 millimoles), 4.43 cc of p-chlorophenol (44 millimoles), 12.3 cc of triethylamine (88 millimoles) and 35.7 grams (40.0 millimoles) of a 13.0 percent solids solution of poly(dichlorophosphazene), having a degree of polymerization of about 2600, in THF. An instantaneous reaction occurred upon mixing as evidenced by the formation of triethylamine hydrochloride and the evolution of heat. The bottle was heated for 20 hours at 120° C. and resulted in the formation of a white milky suspension and a layer of amine salt. The white milky suspension layer was subjected to Infrared Spectroscopy (hereinafter IR) and showed no P—Cl band at 600 cm$^{-1}$. New bands were observed at 557, 528 and 509 cm$^{-1}$. Coagulation of the suspension layer in methanol resulted in the production of 8.34 grams of white polymer plastic.

EXAMPLE 3

Preparation of

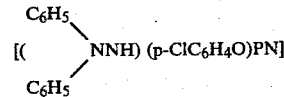

Polymer

To a 10 oz. bottle was charged 100 cc of THF, 9.71 grams (44 millimoles) of diphenyl hydrazine hydrochloride, 4.43 cc (44 millimoles) of p-chlorophenol, 18.4 cc (132 millimoles) of triethylamine and 35.6 grams (39.0 millimoles) of a 13.0 percent solids solution of poly(dichlorophosphazene), having a degree of polymerization of about 2600, in THF. The reaction mixture was heated for 20 hours at 120° C. An IR of the reaction mixture showed no P-Cl band at 600 cm$^{-1}$ and new band at 568, 538 and 508 cm$^{-1}$. Coagulation in methanol produced 9.49 grams of a dark red polymer plastic.

We claim:

1. A polyphosphazene polymer containing units represented by the formulas:

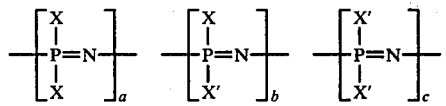

wherein X is

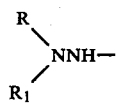

in which R and R$_1$ are selected from the group consisting of alkyl groups containing from 1 to 12 carbon atoms, cycloalkyl groups containing from 3 to 12 carbon atoms and aryl groups; wherein X' is X or is selected from the group consisting of substituted or unsubstituted alkoxy, aryloxy, amino and mercapto groups and wherein $20 \leq (a+b+c) \leq 50,000$ per polymer.

2. The polymer of claim 1 wherein X is

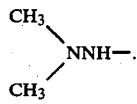

3. The polymer of claim 1 wherein X is

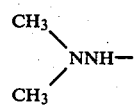

and X' is CF$_3$CH$_2$O—.

4. The polymer of claim 1 wherein X is

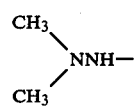

and X' is p—ClC$_6$H$_5$O—.

5. The polymer of claim 1 wherein X is

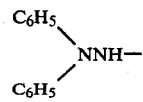

and X' is p—ClC$_6$H$_5$O—.

6. A method of preparing polyphosphazene polymers containing units represented by the formulas:

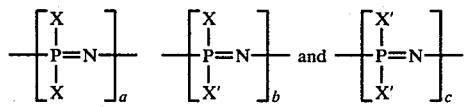

wherein X is

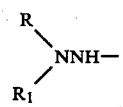

in which R and R$_1$ are selected from the group consisting of alkyl groups containing 1 to 12 carbon atoms, cycloalkyl groups containing from 3 to 12 carbon atoms and aryl groups; wherein X' is X or is selected from the group consisting of substituted or unsubstituted alkoxy, aryloxy, amino and mercapto groups and wherein $20 \leq (a+b+c) \leq 50,000$ per polymer; which method comprises reacting a polydichlorophosphazene polymer having the formula —(NPCl$_2$)$_n$—, wherein n is from 20 to 50,000, with a hydrazine having the formula

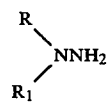

in which R and R$_1$ are selected from the group consisting of alkyl groups containing from 1 to 12 carbon atoms, cycloalkyl groups containing from 3 to 12 carbon atoms and aryl groups, or a mixture of said hydrazine and an aliphatic alcohol, aromatic alcohol, amino compound or mercaptan compound, or mixture thereof, in the presence of a tertiary amine.

7. The method of claim 6 wherein said hydrazine is N,N-dimethyl hydrazine.

8. The method of claim 7 wherein said aliphatic alcohol is trifluoroethanol.

9. The method of claim 6 wherein said mixture is a mixture of N,N-dimethyl hydrazine and trifluoroethanol.

10. The method of claim 6 wherein said mixture is a mixture of N,N-dimethyl hydrazine and p-chlorophenol.

11. The method of claim 6 wherein said mixture is a mixture of diphenyl hydrazine and p-chlorophenol.

12. The method of claim 6 wherein said tertiary amine is triethylamine.

* * * * *